US010352455B2

(12) United States Patent
Berard et al.

(10) Patent No.: US 10,352,455 B2
(45) Date of Patent: Jul. 16, 2019

(54) RADIAL SEAL AND ASSEMBLY

(71) Applicant: Eaton Corporation, Cleveland, OH (US)

(72) Inventors: Gerald M. Berard, North Providence, RI (US); Edward N. Ruggeri, Westport, MD (US)

(73) Assignee: Eaton Intelligent Power Limited, Dublin (IE)

( * ) Notice: Subject to any disclaimer, the term of this patent is extended or adjusted under 35 U.S.C. 154(b) by 19 days.

(21) Appl. No.: 15/535,589

(22) PCT Filed: Dec. 17, 2015

(86) PCT No.: PCT/US2015/066322
§ 371 (c)(1),
(2) Date: Jun. 13, 2017

(87) PCT Pub. No.: WO2016/100636
PCT Pub. Date: Jun. 23, 2016

(65) Prior Publication Data
US 2017/0370474 A1  Dec. 28, 2017

Related U.S. Application Data

(60) Provisional application No. 62/093,792, filed on Dec. 18, 2014.

(51) Int. Cl.
*F16J 15/00* (2006.01)
*F16J 15/34* (2006.01)
(Continued)

(52) U.S. Cl.
CPC ......... *F16J 15/3404* (2013.01); *F01D 11/003* (2013.01); *F01D 11/005* (2013.01);
(Continued)

(58) Field of Classification Search
CPC ...... F16J 15/3404; F16J 15/16; F16J 15/3412; F16J 15/344; F16J 15/54; F01D 11/003; F01D 11/005; F01D 11/008; F01D 11/025
See application file for complete search history.

(56) References Cited

U.S. PATENT DOCUMENTS 4,752,077 A   6/1988 Hoffelner
8,820,752 B2 * 9/2014 Garrison ............... F01D 11/003
                                                 277/579
(Continued)

OTHER PUBLICATIONS

International Search Report, PCT/US2015/066322, dated Feb. 19, 2016.

*Primary Examiner* — Gilbert Y Lee
(74) *Attorney, Agent, or Firm* — Fishman Stewart PLLC

(57) ABSTRACT

A radial seal and radial seal assembly (10) are disclosed. An embodiment of seal assembly may include an inner rotating shaft (20) with inner rotating shaft fluid feed holes (22); a primary segmented seal (30); a secondary segmented seal (40); a tertiary seal (50) that may axially seal the primary and secondary segmented seals; and an outer housing (60) including a plurality of outer housing fluid feed holes (62). In embodiments, the assembly is configured so that, as the inner rotating shaft rotates, the inner rotating shaft fluid feed holes periodically come into fluid communication alignment with outer housing fluid feed holes.

20 Claims, 5 Drawing Sheets

(51) Int. Cl.
*F16J 15/16* (2006.01)
*F16J 15/54* (2006.01)
*F01D 11/00* (2006.01)
*F01D 11/02* (2006.01)

(52) U.S. Cl.
CPC .......... *F01D 11/008* (2013.01); *F01D 11/025* (2013.01); *F16J 15/16* (2013.01); *F16J 15/344* (2013.01); *F16J 15/3412* (2013.01); *F16J 15/54* (2013.01)

(56) References Cited

U.S. PATENT DOCUMENTS

| | | | |
|---|---|---|---|
| 9,850,770 B2 * | 12/2017 | Garrison | ................ F16J 15/441 |
| 2005/0046114 A1 | 3/2005 | Bohner | |
| 2008/0217861 A1 | 9/2008 | Sei | |

* cited by examiner

RADIAL SEAL AND ASSEMBLY

CROSS-REFERENCE TO RELATED APPLICATIONS

This application claims priority to International Patent Application No. PCT/US2015/066322, filed Dec. 17, 2017, which claims the benefit to U.S. Provisional Application Ser. No. 62/093,792, filed Dec. 18, 2014, the contents of both are incorporated by reference in their entireties.

TECHNICAL FIELD

The present disclosure relates generally to seals and sealing systems, including rotary union radial seals and sealing assemblies.

BACKGROUND

Rotary union seals can involve double standard mechanical seal assemblies that process fluids, typically oil, injected between the two seals. Rotary union seals may, for example, be used in applications involving hollow engine shafts. Fluid, such as oil, may be transferred from a casing of an engine (stationary component) via hollow shafts (rotating component). The fluid may then exit at different positions associated with the shaft. Feeding fluids like oil in a rotating shaft with holes can involve functional challenges, including centrifugal forces and sloshing.

With double-seal assemblies, two seals may be mounted back-to-back, for example, in a north-south configuration. Double-seal assemblies may be complex, can result in a significant weight increase, and may be cumbersome for certain applications. In many instances, such double-seal assemblies may be small in size, e.g., less than six inches in diameter. However, on a comparative basis, such double-seal assemblies may consume a considerable amount of axial space as the diameter increases and they may be limited in axial and radial extents.

Among other things, it can be a challenge to provide efficient axial and radial sealing assemblies, including one that may involve a single seal, while seeking compact, simplified, and efficient designs. Moreover, it can be a challenge to provide improved seals for diameters exceeding six inches, utilizing reduced axial space.

SUMMARY

A radial seal and radial seal assembly is disclosed. In an embodiment, a radial seal assembly may include an inner rotating shaft with a plurality of inner rotating shaft fluid feed holes; a primary segmented seal, which may include a spring; a secondary segmented seal, which may include a spring; an additional or tertiary seal; and an outer housing including a plurality of outer housing fluid feed holes. In embodiments, the assembly may be configured so that as the inner rotating shaft rotates, the inner rotating shaft fluid feed holes periodically come into fluid communication alignment (e.g., to permit fluid flow) with the outer housing fluid feed holes. Embodiments can, for example and without limitation, provide a device with sealing and pumping attributes in one unitary combination/assembly.

Various aspects of the present disclosure will become apparent to those skilled in the art from the following detailed description of the various embodiments, when read in light of the accompanying drawings.

BRIEF DESCRIPTION OF THE DRAWINGS

Embodiments of the present disclosure will now be described, by way of example, with reference to the accompanying drawings.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
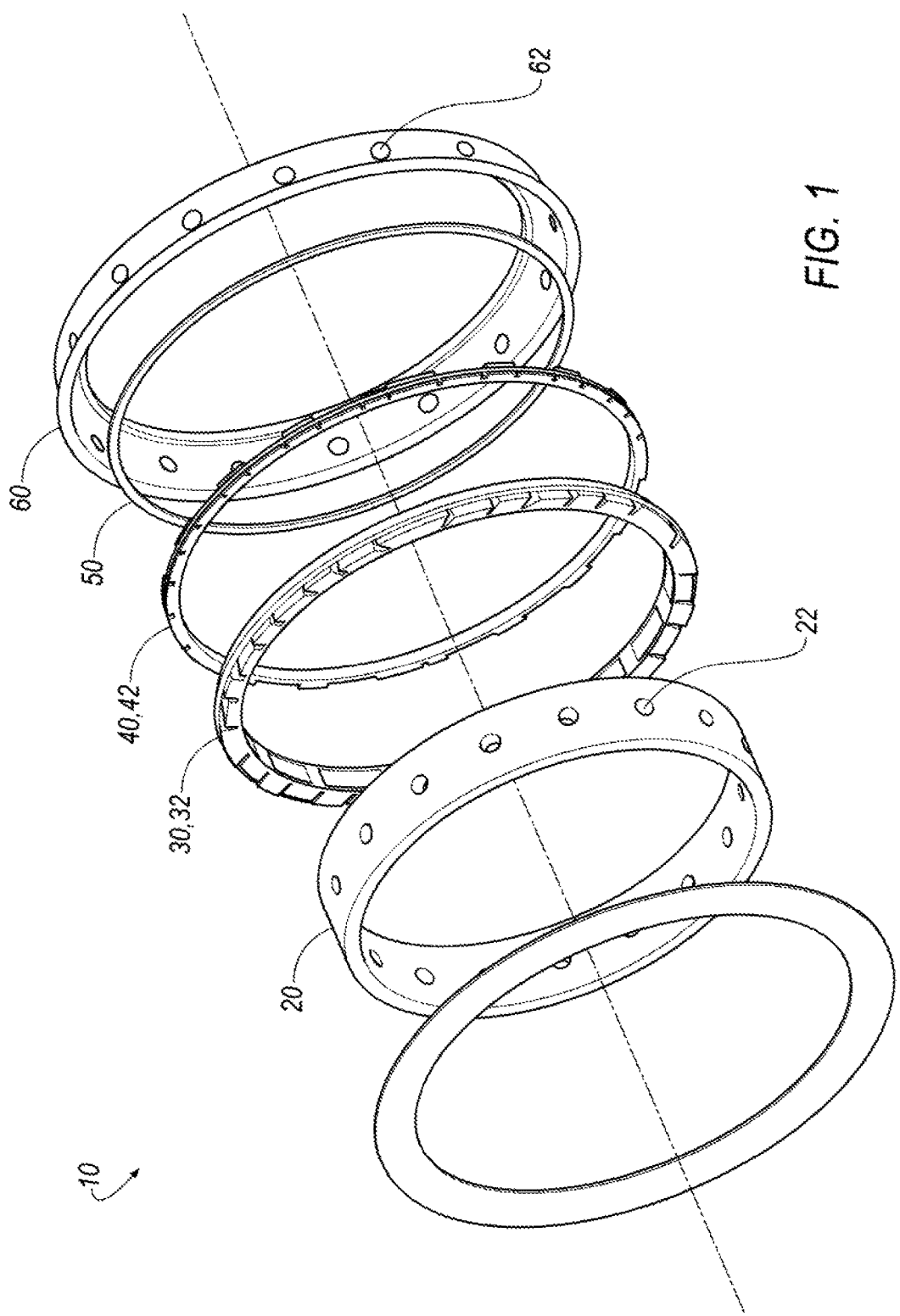
FIG. 1 is an exploded perspective view of a seal assembly according to an embodiment of the present disclosure.
Figure 2:
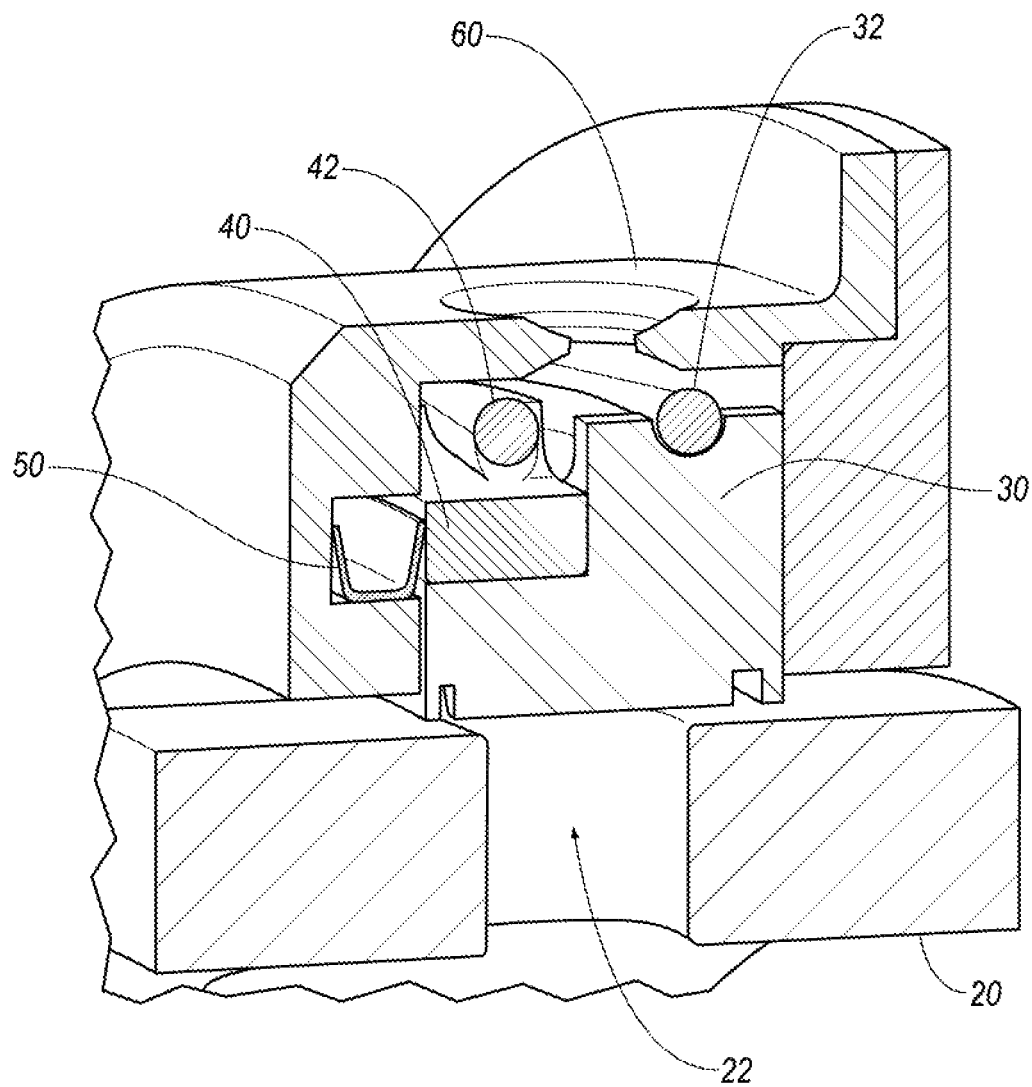
FIG. 2 is a cross-sectional side view of a portion of an embodiment of a seal assembly.

Referring now to FIG. 1, a seal (or sealing) assembly 10 according to an embodiment of the present disclosure is generally illustrated. The seal assembly 10 may comprise a single segmented primary seal assembly that may, for example, provide access on the seal outside diameter (or outer surface) to provide externally-supplied fluid (e.g., oil) to an inner rotating shaft 20, which may comprise a hollow shaft. The seal assembly 10 may comprise an inner rotating shaft 20, including a plurality of inner rotating shaft fluid feed holes 22; a primary segmented seal 30, including a spring, or primary spring (e.g., garter spring 32); a secondary segmented seal 40, including a spring, or secondary spring (e.g., garter spring 42); a seal, such as a tertiary seal 50; and an outer housing 60, including outer housing fluid feed holes 62. With the embodiment illustrated in FIG. 1, the inner rotating shaft 20, is the only depicted component that rotates.

With embodiments, a primary segmented seal 30 and a secondary segmented seal 40 may both be held together by a mechanical component, such as a spring (e.g., a garter spring). Such a configuration can, among other things, serve to limit leakage of fluid (e.g., oil) from an inner pressurized seal area to the outside. As generally illustrated, embodiments of the sealing assembly 10 may include a tertiary seal 50 to force-balance axial pressure loading within the seal housing. A tertiary seal 50 may be configured to provide a pressure balance diameter, and additionally may be spring-loaded to bias mechanical loading of the assembly against a housing wall.

In embodiments, the tertiary seal may, for example and without limitation, comprise a V-seal or another type of suitable seal. Additionally, in embodiments, the tertiary seal may be sized and configured so that the pneumatic loading force in the axial direction is slightly biased. In embodiments, the pneumatic loading force may be biased in a direction that helps prevent collapse of the tertiary seal 50. Accurately balancing this axial force and the spring force of the tertiary seal can reduce the radial friction loading of the segmented seal against the seal housing, which can, among other things, improve (and possibly optimize) the radial dynamic tracking ability of the segmented seal relative to the inner rotating shaft 20. Axial sealing between the process fluid and the outside may be provided by maintaining a close radial fit on both sides of the seal between the segmented seal inside diameter and a rotating shaft.

As generally illustrated, the inner rotating shaft 20 of the seal assembly 10, which may take the form of a unitary ring, may include a plurality of inner rotating shaft fluid feed holes 22. The inner rotating shaft fluid feed holes 22 may be sized, shaped, spaced, and/or configured (individually or collectively) to optimize flow for a given application. With embodiments, the inner rotating shaft fluid feed holes 22 may be evenly spaced around the periphery of the inner rotating shaft 20. However, for some embodiments, the inner rotating shaft fluid feed holes may not all be of uniform size and/or may not be evenly spaced. For example, and without limitation, with some embodiments, the inner rotating shaft fluid feed holes may come in two or more different sizes or diameters, may alternate or form some other pattern, and/or may not be evenly spaced (e.g., the holes may be configured to provide flow or fire off in different or alternating sections or quadrants). The inner rotating shaft fluid feed holes 22, when in relevant position, provide for a fluid connection between the shaft outside diameter (or outer surface) and the rotating shaft to feed fluid, e.g., oil, to the system.

Figure 3A:
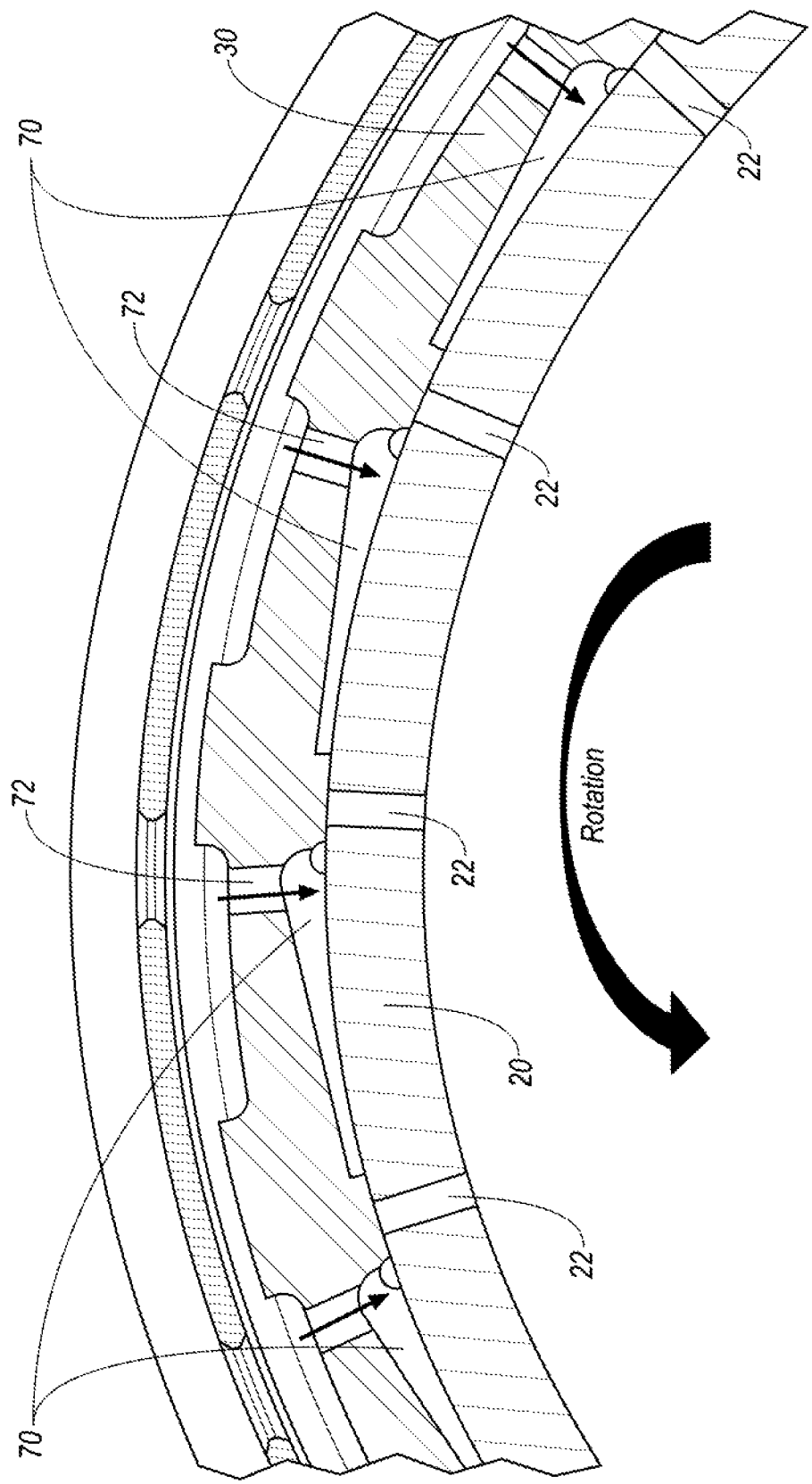
FIGS. 3A-3C are cross-sectional side views of a portion of an embodiment of a seal assembly, generally shown in three different steps/phases.
Figure 3B:
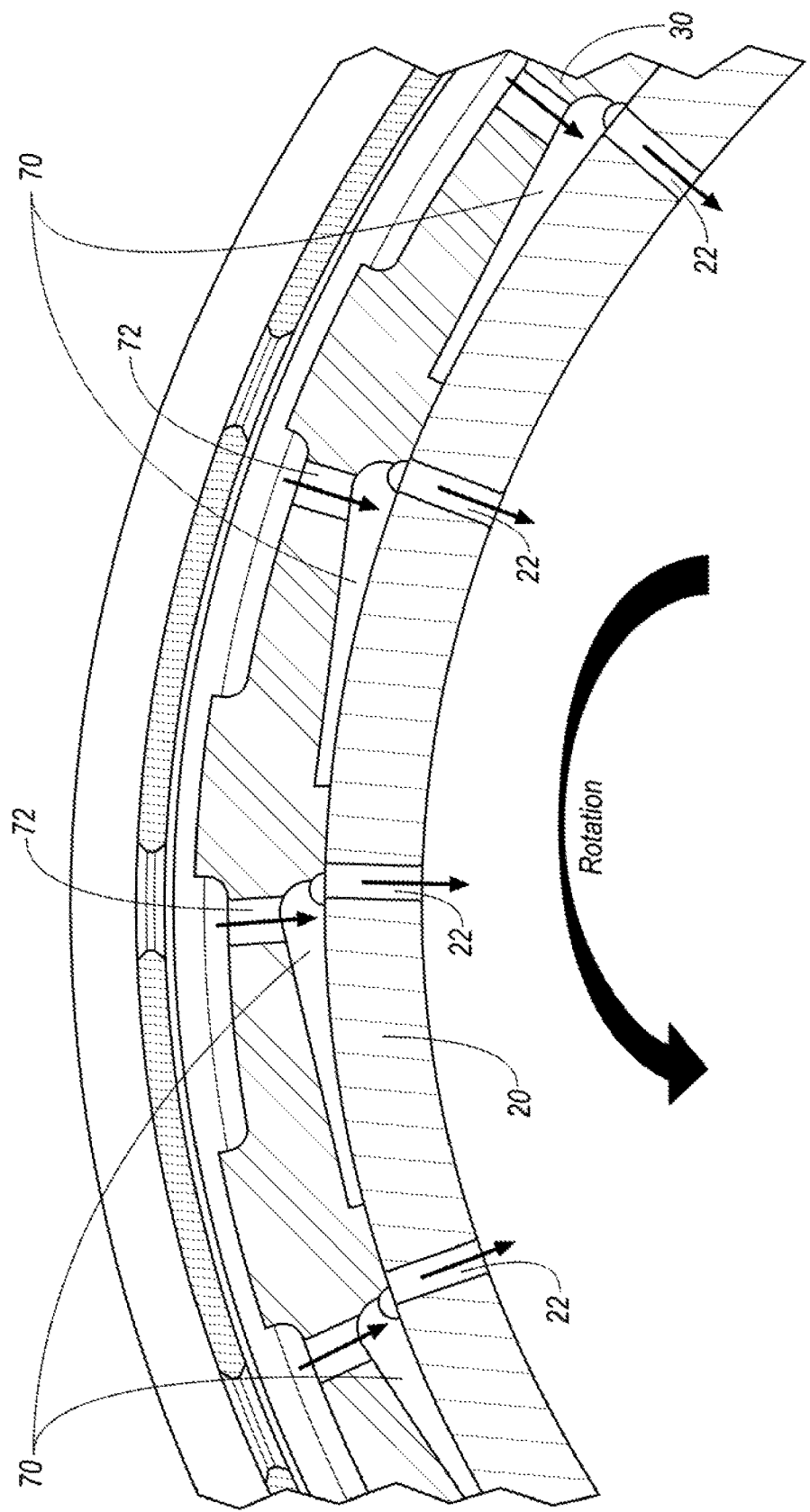
Figure 3C:
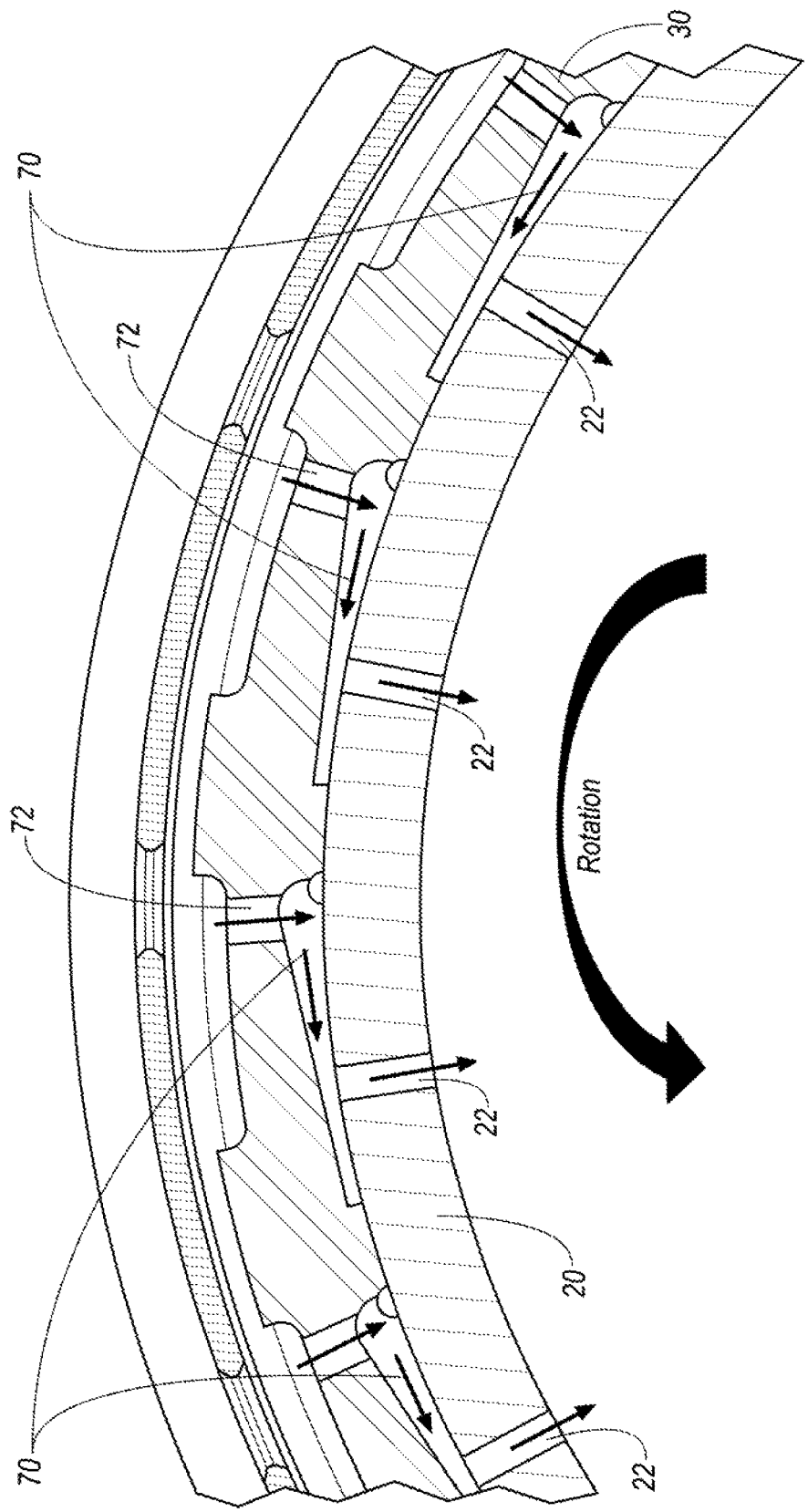

The primary segmented seal 30 includes a plurality of primary segmented seal fluid feed holes (e.g., feed holes 72 illustrated in FIGS. 3A-3C). The shape, spacing, and size of the cavity and the various fluid feed holes may be optimized for applications. Moreover, as mentioned with respect to the inner rotating shaft fluid feed holes, with embodiments, the various holes, including the primary segmented seal fluid feed holes, may also not all be of uniform size and/or shape, and/or may not be evenly spaced. With some embodiments, for example and without limitation, the primary segmented seal fluid feed holes may come in two or more different sizes or diameters, may alternate or form some other pattern, and/or may not be evenly spaced (e.g., the holes may be configured to provided flow or fire off in different or alternating sections or quadrants). Such optimization of hole design and/or system fluid flow may be optimized using computational methods such as, without limitation, finite element analysis (FEA), computation fluid dynamics (CFD) and/or feedback testing.

With embodiments, an oil casing of an engine may transfer fluid, such as oil, into a rotating shaft. The fluid can then be transferred to openings where the fluid may be released. With general reference to FIG. 3A through FIG. 3C, which illustrate partial sectional views of an embodiment of a segmented seal and housing, pressurized oil—a pressure high enough to overcome centrifugal forces—may be provided. With the rotation of the inner rotating shaft 20, and the alignment of respective fluid feed holes 22, fluid (e.g., oil) may be sealed off, pressurized, and pressed/flushed out with respect to the inner cavities 70 to overcome centrifugal forces in a constant-feed process.

For embodiments, the process involving the feed holes and grooves may be generally outlined as follows: (a) external high pressure fluid (e.g., oil) feed the outside diameter (or outer surface) of the primary segmented seal 30 with fluid and, correspondingly, feeds and pressurizes the seal inner cavity 70, such as generally illustrated in the embodiments illustrated in FIGS. 3A through 3C; (b) initially (such as illustrated in FIG. 3A), an inner rotating shaft hole 22 may not be in the vicinity (e.g., fluid communication alignment) with the seal inner cavity 70; (c) as the inner rotating shaft hole 22 rotates, the inner rotating shaft hole 22 may come into the vicinity of operational or fluid communication alignment with the seal inner cavity 70 (e.g., FIGS. 3B and 3C), and the high pressure fluid may overcome centrifugal forces or loads to flush the seal inner cavity 70, forcing fluid through the inner rotating shaft holes 22 (see, e.g. FIG. 3B). Once the inner rotating shaft holes 22 rotate past the seal inner cavity 70, the process may repeat with the rotation of the inner rotating shaft 20

Said differently, with the positioning generally illustrated in FIG. 3A, the inner rotating shaft holes (or "inner shaft feed holes") 22 may be sealed off or operationally segregated by the seal inside diameter (e.g., an inner radial surface of the primary segmented seal). In that phase, the seal inner cavity ("inner cavities") 70 may fill with fluid (e.g., oil). With rotation of the inner rotating shaft 20 (shown in the embodiment as counterclockwise) reaching an operational or fluid communication alignment with the seal inner cavities 70 (see, e.g., FIG. 3B), the oil from the seal inner cavities 70 may begin to vent out (as generally depicted by flow arrows) through the inner rotating shaft holes 22. As the inner rotating shaft 20 continues to rotate further (see, e.g., FIG. 3C), the flow of fluid, such as oil, may begin to drop off or decrease, allowing the seal inner cavities 70 to pressurize. The foregoing cycle may repeat many times, and substantially continuously, with rotation of the inner rotating shaft 20. With embodiments of the assembly, the aforementioned repetition of "sealing off" and "flushing out" of fluid can be provided to effectively provide a constant feeding of fluid to a shaft.

Some benefits of the disclosed seal assembly may include, without limitation, (a) configurations with axial sizes that are comparatively smaller, and possibly simpler, than conventional assemblies; (b) an ample supply of pressurized fluid (e.g., oil) may be provided into an inner seal cavity to better ensure there is sufficient pressure to overcome centrifugal forces; and/or (c) the design of the inner cavity may be such that some film-riding between the seal inside diameter and the inner rotating shaft is provided during pressurization cycles, such that contact between the seal inside diameter and the inner rotating shaft may be reduced, and perhaps minimized.

With embodiments, the overall design may be further simplified for some applications by providing a single break primary seal ring and the tertiary seal held together with a spring, such as a garter spring. With such a configuration, a secondary segmented seal would not be required.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed is:

1. A radial seal assembly, the radial seal assembly comprising:
   an inner rotating shaft, the inner rotating shaft including a plurality of inner rotating shaft fluid feed holes;
   a primary segmented seal including a primary spring;
   a secondary segmented seal including a secondary spring;
   an outer housing, the outer housing including a plurality of outer housing fluid feed holes; and
   a tertiary seal configured to axially seal the primary segmented seal and the secondary segmented seal;

wherein the assembly is configured so that as the inner rotating shaft rotates, the inner rotating shaft fluid feed holes periodically come into fluid communication alignment with the outer housing fluid feed holes such that fluid flows from the outer housing fluid feed holes to the inner rotating shaft fluid feed holes.

2. The redial seal assembly of claim 1, wherein the tertiary seal comprises a V-seal.

3. The radial seal assembly of claim 1, wherein the primary spring and the secondary spring are garter springs.

4. The radial seal assembly of claim 1, wherein the secondary segmented seal is configured to limit leakage of fluid from an inner pressurized area to outside of the assembly.

5. The radial seal assembly of claim 1, wherein the plurality of inner rotating shaft fluid feed holes are evenly spaced around a circumference of the inner rotating shaft.

6. The radial seal assembly of claim 1, wherein the plurality of inner rotating shaft fluid feed holes are provided in at least two different shape or sizes.

7. The radial seal assembly of claim 1, wherein the primary segmented seal includes a plurality of inner cavities and a plurality of primary segmented seal fluid feed holes in fluid communication with the plurality of inner cavities.

8. The radial seal assembly of claim 7, wherein the primary segmented seal fluid feed holes are evenly-spaced.

9. The radial seal assembly of claim 7, wherein the assembly is configured such that, as the inner rotating shaft rotates, the primary segmented seal fluid feed holes periodically come into fluid communication alignment with the inner rotating shaft fluid feed holes.

10. The radial seal assembly of claim 7, wherein the geometry and size of the inner cavities and primary segmented seal fluid feed holes are optimized for fluid flow through the assembly using computational finite element analysis, computational fluid dynamics, or testing performance feedback.

11. The radial seal assembly of claim 1, wherein the tertiary seal is spring-loaded to bias mechanical loading of the assembly against a wall of the housing.

12. The radial seal assembly of claim 1, wherein the tertiary seal is configured to balance axial pressure loading.

13. The radial seal assembly of claim 1, the radial seal assembly configured such that, as the inner rotating shaft rotates, and as pressurized fluid radially inwardly feeds an outer radial surface of the primary segmented seal, a plurality of inner cavities of the primary segmented seal are fed and pressurized.

14. A radial seal assembly, the radial seal assembly comprising:
an inner rotating shaft, the inner rotating shaft including a plurality of inner rotating shaft fluid feed holes;
a primary segmented seal including a plurality of inner cavities, a plurality of primary segmented seal fluid feed holes in fluid communication with the plurality of inner cavities, and a spring; and
an outer housing, the outer housing including a plurality of outer housing fluid feed holes; and
wherein, the assembly is configured such that external fluid under pressure feeds the plurality of primary segmented seal fluid feed holes and the plurality of inner cavities, and pressurizes the inner cavities; as the inner rotating shaft rotates, the inner rotating shaft fluid feed holes come into fluid communication with the seal inner cavities, the fluid in the cavities is pressurized to overcome centrifugal forces or loads, and the inner cavities force fluid radially inward through the inner rotating shaft fluid feed holes.

15. The radial seal assembly of claim 14, wherein the assembly is configured such that, as the inner rotating shaft rotates, the inner rotating shaft fluid feed holes are periodically sealed off or operationally segregated by an inner radial surface of the primary segmented seal, and the inner cavities of the primary segmented seal are filled with fluid provided radially inward under external pressure.

16. The radial seal assembly of claim 14, wherein, with fluid under an external pressure and the rotation of the inner rotating shaft, and the periodic alignment of inner radial shaft holes and inner cavities, fluid is provided to the inner rotating shaft substantially continuously.

17. The radial seal assembly of claim 14, wherein the primary segmented seal fluid feed holes are evenly-spaced.

18. The radial seal assembly of claim 14, wherein the primary segmented seal fluid feed holes are provided in at least two different shape or sizes.

19. The radial seal assembly of claim 14, wherein the plurality of inner rotating shaft fluid feed holes are evenly spaced around a circumference of the inner rotating shaft.

20. The radial seal assembly of claim 14, wherein the plurality of inner rotating shaft fluid feed holes are provided in at least two different shape or sizes.

* * * * *